July 3, 1934.   C. A. GERLACH ET AL   1,965,182
ELECTRICAL DISTRIBUTING APPARATUS
Filed July 18, 1929   2 Sheets-Sheet 1
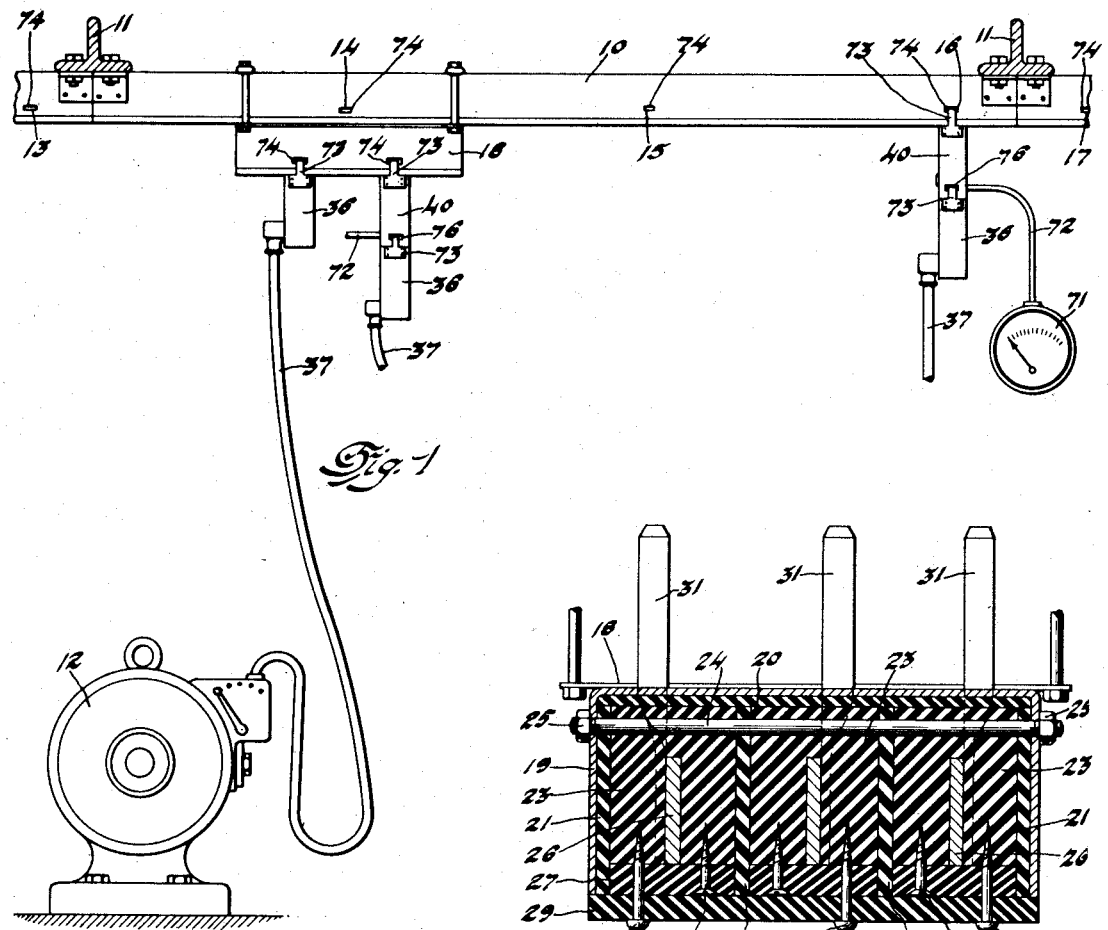
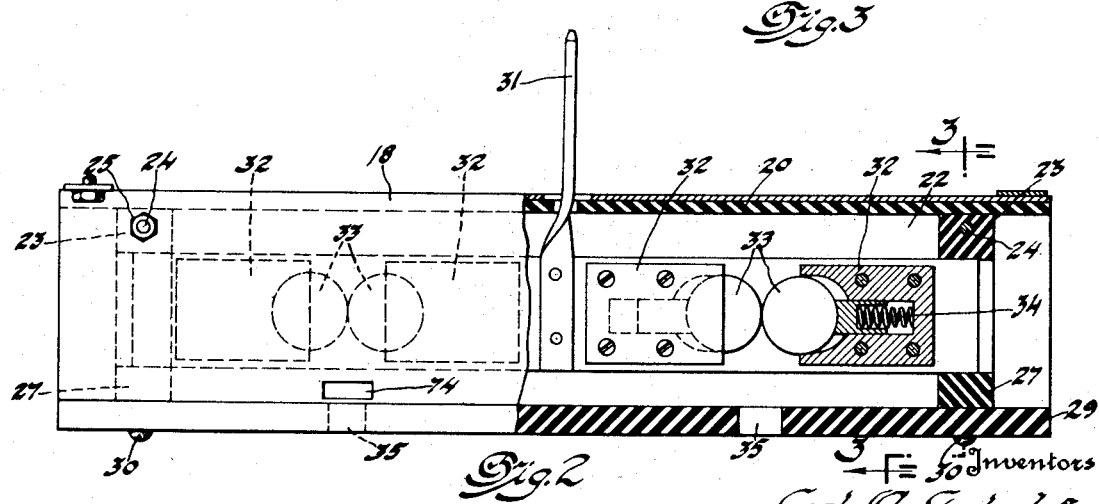
Inventors
Carl A. Gerlach &
Wilbur E. Sanders July 3, 1934.  C. A. GERLACH ET AL  1,965,182
ELECTRICAL DISTRIBUTING APPARATUS
Filed July 18, 1929   2 Sheets-Sheet 2

Inventors
Carl A. Gerlach &
Wilbur E. Sanders
By Blackmore, Spencer & Hink
Attorneys Patented July 3, 1934

1,965,182

UNITED STATES PATENT OFFICE 1,965,182

ELECTRICAL DISTRIBUTING APPARATUS

Carl A. Gerlach and Wilbur E. Sanders, Muncie, Ind., assignors to General Motors Corporation, a corporation of Delaware Application July 18, 1929, Serial No. 379,206

2 Claims. (Cl. 173—334)

In our co-pending application, S. N. 285,686, filed June 15, 1928, there is disclosed a system for the distribution of electric energy, which includes a conduit adapted to be secured to a wall or the ceiling of a building and containing spaced conductors in the form of bus bars through which electric energy is adapted to be conducted to various parts of the building. To conduct electric energy from the conduit to machines located at various points in the building, there are provided, in this system, power take-off plugs having connector prongs adapted to extend through openings provided at spaced points in the length of the conduit and into contact with contact devices carried by the bus bars, and conductors electrically connecting each of the power take-off plugs to one of the machines.

The present invention relates to electric apparatus for use in connection with the above-described system.

More particularly, this invention relates to a device, which is adapted to be electrically connected to a set of the contact devices in the conduit and in which there are provided a plurality of sets of contact devices to each of which a power take-off plug may be electrically connected, so that a number of machines may be electrically connected to the bus bars in the conduit through a single set of the contact devices thereon; and to a device to which an electric indicating or recording instrument is adapted to be connected, which is adapted to be electrically connected to a set of the contact devices in the conduit or in the device described in the preceding portion of this paragraph, and to which a power take-off plug is adapted to be electrically connected, so that an instrument may be inserted into the circuit leading to any machine and readings taken while the machine is in operation, without interrupting the circuit except momentarily.

For a better understanding of the nature and objects of the present invention, reference is made to the following specification, in which are described the preferred embodiments of our invention which are illustrated in the accompanying drawings.

In the drawings:

Figure 1 is a fragmentary, more or less diagrammatic view of an installation in which is embodied our invention.

Figure 2 is an enlarged side elevation, with parts broken away and in section, of the adapter shown in Figure 1.

Figure 3 is a section taken on the line 3—3 of Figure 2.

Figure 4:
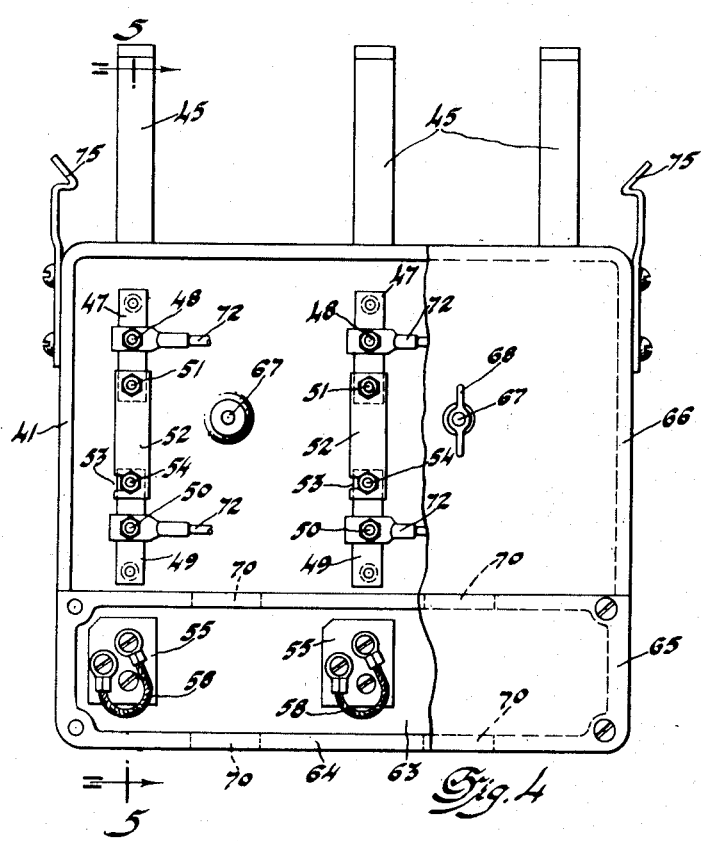
Figure 4 is an enlarged view of one side of the test plug shown in Figure 1, with portions of the covers removed.

In the drawings, the reference character 10 indicates a conduit of the type disclosed in our co-pending application, hereinbefore mentioned, and which is secured to the beams 11 of the ceiling of a building, on the floor of which are located a plurality of machines 12 which utilize electric energy as a source of power.

The conduit 10, in cross section, is similar to the adapter, of which a cross section is shown in Figure 3 and hereinafter described. On each of the bus bars at spaced intervals, such as 13, 14, 15, 16 and 17, opposite openings in the cover of the conduit 10, there are provided contact devices which are similar to those on the bus bars of the adapter which are shown in Figure 2 and hereinafter described.

In order that electric energy for a number of machines may be taken off the bus bars through a single set of the contact devices in the conduit 10, we provide the adapter 18 shown in Figures 1 to 3 of the drawings.

The adapter includes a channel-shaped housing 19 lined on its bottom and sides with sheets of insulating material 20 and 21. The interior of the housing is divided into a plurality of longitudinally extending compartments by a plurality of partitions 22 of insulating material, of which the number depends on the number of bus bars to be provided in the adapter. The partitions 22 are spaced apart, and the ends of the housing closed, by bus bar supports 23 of insulating material. The lining members 20 and 21, the partitions 22, and the bus bar supports 23 are secured to the housing 19 by rods 24 on the opposite ends of which are screwed nuts 25. In each of the compartments of the adapter, there is located a bus bar 26 which is seated in notches in the bus bar supports therein and which is held in place therein by caps 27 which are secured to the bus bar supports by screws 28. The lower open side of the adapter is closed by a cover plate 29 of insulating material which is secured in place thereon by screws 30.

To each of the bus bars is secured a contact prong 31 which extends through an opening in the bottom of the housing 19. On each of the bus bars, there are provided a plurality of sets of transversely aligned pairs of contact roller housings 32. In each of these housings, there is located a contact roller 33. The rollers 33 in each pair of contact housings, are urged into abutting relation with each other by springs 34. In the cover of the adapter, there is provided, at a point opposite the point of contact of each pair of contact rollers, an opening 35.

When it is desired to operate a number of electric machines at a point adjacent one set of the contact devices in the conduit 10, the adapter 18 is secured to the conduit, by suitable means, such as those shown in Figure 1, with each of the prongs 31 engaged between a pair of the contact rollers of a set of the contact devices on the bus bars in the conduit. To conduct electric energy from the bus bars in the adapter to the machines, the desired number of power take-off plugs 36, which may be similar to those described in our co-pending application, hereinbefore mentioned, and which are electrically connected to the machines by conductors 37, are electrically connected to the bus bars in the adapted by inserting the contact prongs thereof between pair of the contact rollers 33. For mechanically securing the power take-off plug to the adapter 18 or the conduit 10, as the case may be, there are provided on the plugs spring catches 73 adapted to engage notches 74 provided on the adapter and on the conduit.

It will be understood, of course, that practically any number of sets of transversely aligned contact devices may be provided in the adapter. It is, of course, possible to provide, instead of the adapter, a greater number of contact devices in the conduit 10, but by providing the adapter, we avoid the expense of installing a greater number of contact devices in the conduit 10 than would ordinarily be used.

In order that there may be inserted in the circuit leading to any of the machines 12 any type of electrical indicating or recording instrument so that readings may be taken while the machine is in operation without interrupting the circuit except momentarily, we provide what may be termed a test plug 40.

Figure 5:
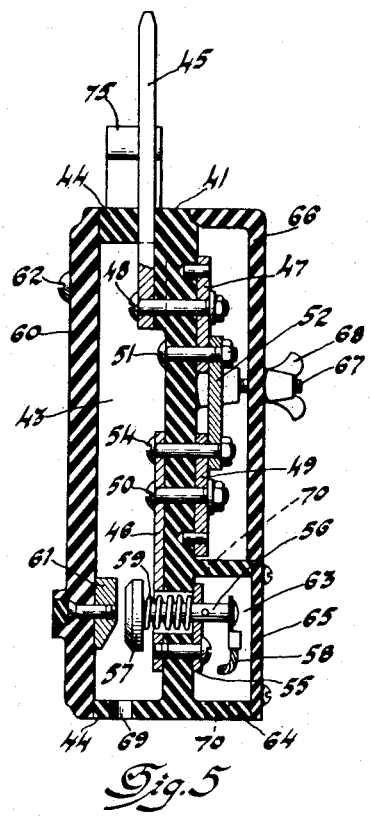
Figure 5 is a section taken on the line 5—5 of Figure 4.
Figure 6:
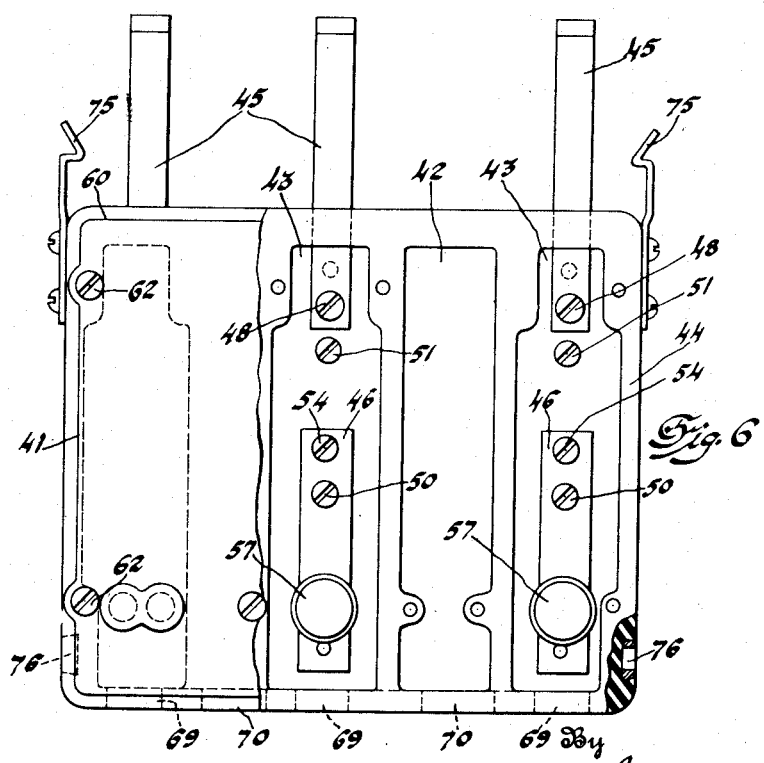
Figure 6 is a view, similar to Figure 4, of the opposite side of the test plug shown in Figure 4.

The test plug, which is shown in Figures 1 and 4 to 6 of the drawings, includes a body 41 of insulating material in one side of which is formed a substantially rectangular recess which is preferably subdivided longitudinally of the plug into a number of separate compartments 42 and 43. Into one end of each of the compartments 43, through the wall 44 which bounds the recess, above-mentioned, extends one end of a contact prong 45. Adjacent the end of each of the compartments 43 distant from that in which the inner end of the contact prong is located, there is located a longitudinally extending bar 46 of a suitable conducting material, such as copper.

On the side of the body opposite that on which the prongs 45 and bars 46 are located, there is provided opposite the inner end of each of the prongs a longitudinally extending bar 47 of a suitable conducting material, which is electrically connected to the prong by a bolt 48 which also secures both the prong and the bar 47 to the body. On the same side of the body as the bars 47 and opposite the inner end of each of the bars 46, there is located a bar 49 of a suitable conducting material which is electrically connected to the bar 46 by a bolt 50, which also secures the bars 46 and 49 to the body. Through the body and through each of the bars 47 extends a bolt 51 on which is pivotally mounted a connecting link 52 of suitable conducting material in which, adjacent its end distant from the pivot 51, there is provided a notch 53 which is adapted to engage around a bolt 54, which extends through the bar 46, the body, and the bar 49, to electrically connect each of the prongs to the corresponding bar 49 when desired.

Through the outer end of each of the bars 46, through the body, and through a plate 55 which is located on the opposite side of the body from the bar 46, extends the shank of a headed contact member 56, of which the head 57 is located in the corresponding compartment 43. The plate 55 is electrically connected to the shank of the contact member 56 by a flexible cable 58. Surrounding the shank of the contact member 56 and bearing at its opposite ends against the head 57 and the plate 55, is a coiled spring 59 which urges the head away from the body.

The open sides of the compartments 42 and 43 are closed by a cover plate 60 which carries contact blocks 61 arranged opposite each of the heads of the contact members 56 and which is removably secured to the body of the plug by screws 62. The shank ends of the contact members 56, the plates 55, and the cables 58, are located in a recess 63 which is bounded by a wall 64 and of which the open side is adapted to be closed by a removable cover plate 65. To conceal the bars 47, the connecting links 52, the bars 49, and associated parts, there is provided a cover member 66 which is removably secured to the body by means of studs 67 and wing nuts 68.

In the end wall 44 of the body, distant from that through which the prongs 45 project there is provided opposite each of the contact blocks 61, an opening 69, and in each of the end walls 64 of the recess 63 a pair of openings 70, for purposes hereinafter described.

When it is desired to insert an electric indicating or recording instrument, such as that indicated by the reference character 71, in the circuit leading to any one of the machines 12, the instrument is connected to one or more of the bars 47 and/or one or more of the bars 49 by means of leads 72. The leads 72 may be led to the outside of the plug through the openings 70 in the end walls of the recess 63, or the cover plate 65 may be removed and the leads 72 led to the outside of the plug through the inner openings 70 and the open side of the recess 63. If the instrument is of the type which is to be put in series with the circuit leading to the machine, the circuit through the test plug will be opened by swinging the links 52 into positions in which they are out of contact with the bars 49, and leads from the instrument will be connected to both the bars 47 and the bars 49. If the instrument is of the type which is to be put in parallel with the circuit leading to the machine, the links 52 are left in the positions in which they are shown in the drawings, and the leads from the instrument connected to either the bars 47 or the bars 49, or both.

After the desired instrument has been properly connected to the test plug, the power take-off plug 36, which connects the machine, into the circuit of which it is desired to insert the instrument, to the bus bars in the conduit 10 or the adapter 18, is removed from the conduit or the adapter, as the case may be, and the test plug connected thereto so that its contact prongs 45 are in contact with the contact devices therein instead. Then the power take-off plug is electrically connected to the test plug by inserting its contact prongs through the openings 69 and between and into contact with the heads of the contact members 56 and the contact blocks 61. In order that the test plug may be mechanically fastened to the conduit 10 or the adapter 18, and that the power take-off plug may be mechanically fastened to the test plug, there are provided on the test plug spring catches 75, which are adapted to engage in the notches 74 in the conduit or the adapter, as the case may be, and notches 76 adapted to be engaged by the spring catches 73 on the power take-off plug. The circuit is, after this operation which takes but a few moments, again complete, and the machine concerned, can be operated as if the test plug were not in the circuit. When the desired readings have been obtained, the test plug may be removed from the circuit by an operation which is entirely apparent and which takes no more time than that of inserting the plug into the circuit.

Although we have shown and described preferred embodiments of our invention, it is to be understood that this has been done by way of example and not by way of limitation and that the scope of the invention is to be determined only by the appended claims.

We claim:

1. In an adapter of the class described, a channel-shaped metal housing, a lining of insulating material within the housing, a partition of insulating material extending longitudinally within the housing, members of insulating material spacing the partition from the walls of the housing, conductors extending longitudinally of the housing and supported by the members, a contact prong attached to each of the conductors and extending through the bottom of the housing, and a plurality of sets of longitudinally spaced contact devices on the conductors through which prongs of a plurality of power take-off plugs are adapted to be connected thereto.

2. In an adapter of the class described, a channel-shaped metal housing, transversely extending members of insulating material within the housing, conductors extending longitudinally of the housing and supported and maintained in spaced relation by the members, a contact prong attached to each of the conductors and extending through the bottom of the housing, and a plurality of sets of longitudinally spaced contact devices on the conductors through which prongs of a plurality of power take-off plugs are adapted to be connected thereto.

CARL A. GERLACH.
WILBUR E. SANDERS.